(12) United States Patent
Zhang et al.

(10) Patent No.: US 11,943,048 B2
(45) Date of Patent: Mar. 26, 2024

(54) ETHERNET FRAME TRANSMISSION METHOD AND COMMUNICATIONS DEVICE

(71) Applicant: VIVO MOBILE COMMUNICATION CO., LTD., Guangdong (CN)

(72) Inventors: Yanxia Zhang, Guangdong (CN); Yumin Wu, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 263 days.

(21) Appl. No.: 17/377,744

(22) Filed: Jul. 16, 2021

(65) Prior Publication Data

US 2021/0344441 A1 Nov. 4, 2021

Related U.S. Application Data

(63) Continuation of application No. PCT/CN2020/072749, filed on Jan. 17, 2020.

(30) Foreign Application Priority Data

Jan. 18, 2019 (CN) .......................... 201910108455.8

(51) Int. Cl.
*H04L 1/00* (2006.01)
*H04W 28/06* (2009.01)
*H04W 80/02* (2009.01)

(52) U.S. Cl.
CPC ........... *H04L 1/0007* (2013.01); *H04W 28/06* (2013.01); *H04W 80/02* (2013.01)

(58) Field of Classification Search
CPC ...... H04L 1/0007; H04W 28/06; H04W 80/02

USPC .......................................................... 370/392
See application file for complete search history.

(56) References Cited

U.S. PATENT DOCUMENTS

| | | | |
|---|---|---|---|
| 2003/0002519 A1 | 1/2003 | Terry et al. | |
| 2015/0194999 A1 | 7/2015 | Lea et al. | |
| 2018/0092113 A1 | 3/2018 | Negoto et al. | |
| 2018/0183723 A1 | 6/2018 | Cariou et al. | |
| 2019/0207864 A1 | 7/2019 | Taniguchi et al. | |
| 2020/0107221 A1* | 4/2020 | Prakash | H04L 69/22 |
| 2021/0044454 A1 | 2/2021 | Xu et al. | |

FOREIGN PATENT DOCUMENTS

| | | |
|---|---|---|
| CN | 101882975 A | 11/2010 |
| CN | 103825869 A | 5/2014 |
| CN | 104079488 A | 10/2014 |
| CN | 110417633 A | 11/2019 |
| JP | 11510018 A | 8/1999 |
| WO | 2018037451 A1 | 3/2018 |

OTHER PUBLICATIONS 62737591p (Year: 2018).*
R2-1816765 (Year: 2018).*

(Continued)

*Primary Examiner* — Intekhaab A Siddiquee
(74) *Attorney, Agent, or Firm* — Price Heneveld LLP

(57) ABSTRACT

An Ethernet frame transmission method and a communications device are provided. The method includes: removing a specified field from an Ethernet frame; and transmitting the Ethernet frame with the specified field removed to a second device.

20 Claims, 5 Drawing Sheets

---

Remove a specified field from an Ethernet frame — 201

Transmit the Ethernet frame with the specified field removed to a second device — 202

(56) References Cited

OTHER PUBLICATIONS

Ericsson, "Ethernet Header Compression," 3GPP TSG-RAN WG2 #104, R2-1817175, Spokane, USA Nov. 12-16, 2018 (9 pages).
Intel Corporation, "Ethernet Header Compression," 3GPP TSG-RAN WG2 Meeting #104, R2-1816765, Spokane USA Nov. 12-16, 2018 (5 pages).
Ericsson, Presentation sheet TS for 29.561 v 1.0.0 for 5G System; Interworking between 5G Network and external Data Networks; Stage 3, La Jolla, US, Jun. 11-12, 2018 (1 page).
3rd Generation Partnership Project, Technical Specification Group Core Network and Terminals; 5G System; Interworking between 5G Network and external Data Networks, 3GPP TS 29.561 V1.0.0 Valbonne—France, (Jun. 2018) (44 pages).
Vivo, "Ethernet MAC header compression", 3GPP TSG-RAN WG2 Meeting #104, R2-1816938, Spokane, USA, 12'"—16'"Nov. 2018.
Nokia, "Ethernet traffic", 3GPP TSG CT4 Meeting #84, C4-183246, KunMing, P.R. China; Apr. 15-20, 2018.
Huawei et al., "Support of Ethernet frames on N4", 3GPP TSG CT4 Meeting #83, C4-182392, Montreal, Canada; 261h Feb.-Mar. 2, 2018.
Ericsson, "Interworking with Ethernet DN", 3GPP TSG-CT WG3 Meeting #96, C3-182382, Kunming, China, Apr. 16-20, 2018.
Mediatek Inc., "Ethernet Header Compression", 3GPP TSG-RAN WG2 Meeting #104, R2-1816689, Spokane, USA, 1ih—161h Nov. 2018.

\* cited by examiner

ETHERNET FRAME TRANSMISSION METHOD AND COMMUNICATIONS DEVICE

CROSS-REFERENCE TO RELATED APPLICATIONS

This application is continuation application of PCT International Application No. PCT/CN2020/072749 filed on Jan. 17, 2020, which claims priority to Chinese Patent Application No. 201910108455.8, filed in China on Jan. 18, 2019, the disclosures of which are incorporated herein by reference in their entireties.

TECHNICAL FIELD

This disclosure relates to the field of communications technologies, and in particular, to an Ethernet frame transmission method and a communications device.

BACKGROUND

The $3^{rd}$ Generation Partnership Project (3GPP) has defined a 5G system (5GS) as a black box for Ethernet frame transmission. To be specific, a terminal and a 3GPP network are viewed as a virtual bridge as a whole regardless of the internal structure. For downlink data, the terminal is an egress of the bridge, and a user plane function (UPF) is an ingress of the bridge. For uplink data, the terminal is an ingress of the bridge, and the UPF is an egress of the bridge. In an industrial environment, payload (payload) carried in an Ethernet frame is relatively small in most cases. If a complete Ethernet frame is transmitted in a 5G system, relatively large resource overheads are required for transmitting the Ethernet frame.

SUMMARY

Embodiments of this disclosure provide an Ethernet frame transmission method and a communications device.

According to a first aspect, some embodiments of this disclosure provide an Ethernet frame transmission method, applied to a first device, including:
  removing a specified field from an Ethernet frame; and
  transmitting the Ethernet frame with the specified field removed to a second device.

According to a second aspect, some embodiments of this disclosure provide an Ethernet frame transmission method, applied to a second device, including:
  receiving, from a first device, an Ethernet frame with a specified field removed; and
  adding the specified field to the Ethernet frame.

According to a third aspect, some embodiments of this disclosure provide a communications device. The communications device is a first device and includes:
  a removing module, configured to remove a specified field from an Ethernet frame; and
  a first transmission module, configured to transmit the Ethernet frame with the specified field removed to a second device.

According to a fourth aspect, some embodiments of this disclosure provide a communications device. The communications device is a second device and includes:
  a first receiving module, configured to receive, from a first device, an Ethernet frame with a specified field removed; and
  an adding module, configured to add the specified field to the Ethernet frame.

According to a fifth aspect, some embodiments of this disclosure provide a communications device, including a memory, a processor, and a program stored in the memory and capable of running on the processor, where when the program is executed by the processor, the steps of the Ethernet frame transmission method according to the first aspect are implemented, or the steps of the Ethernet frame transmission method according to the second aspect are implemented.

According to a sixth aspect, some embodiments of this disclosure provide a computer-readable storage medium, where the computer-readable storage medium stores a computer program, and when the computer program is executed by a processor, the steps of the Ethernet frame transmission method according to the first aspect are implemented, or the steps of the Ethernet frame transmission method according to the second aspect are implemented.

In some embodiments of this disclosure, the specified field is removed from the Ethernet frame; and the Ethernet frame with the specified field removed is transmitted to the second device. Since the specified field is removed from the Ethernet frame, resource overheads required for transmitting the Ethernet frame can be reduced.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains based on the embodiments of this disclosure shall fall within the protection scope of this disclosure.

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In some embodiments of this disclosure, the word such as "exemplary" or "for example" is used to represent giving an example, an instance, or an illustration. Any embodiment or design scheme described as "an example" or "for example" in some embodiments of this disclosure should not be construed as being more preferred or advantageous than other embodiments or design schemes. Specifically, the terms such as "an example" or "for example" are used to present related concepts in a specific manner.

The following describes the embodiments of this disclosure with reference to the accompanying drawings. An Ethernet frame transmission method and a communications device provided in some embodiments of this disclosure can be applied to a wireless communications system. The wireless communications system may be a 5G system, an evolved long term evolution (eLTE) system, an LTE system, or a later evolved communications system.

Figure 1:
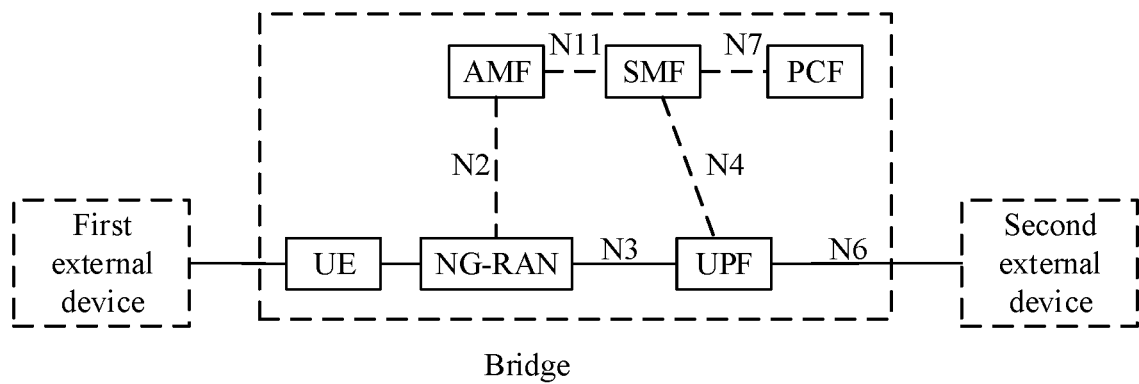
FIG. 1 is a schematic diagram of an architecture of a wireless communications system to which some embodiments of this disclosure may be applied.

FIG. 1 is a schematic diagram of an architecture of a wireless communications system to which some embodiments of this disclosure may be applied. In this architecture, a terminal (for example, UE) and a wireless communications network constitute a bridge, as shown by a dashed-line box. The bridge is a virtual bridge. The bridge includes the terminal (for example, UE), a new radio-radio access network (NG-RAN), an access and mobility management function (AMF), a session management function (SMF), a policy control function (PCF), and a user plane function (UPF). For downlink data, the UE is an egress device of the bridge (Bridge), and the UPF is an ingress device of the bridge. For uplink data, the UE is an ingress device of the bridge, and the UPF is an egress device of the bridge. In addition, the UE may establish a connection with a first external device, and the UPF may establish a connection with a second external device. It should be noted that in some embodiments of this disclosure, the external device is not limited, and may be any device that can establish a connection with the UE or the UPF.

It should be noted that in some embodiments of this disclosure, the terminal may be user equipment (UE) or other terminal-side devices, for example, a mobile phone, a tablet personal computer (Tablet Personal Computer), a laptop computer (Laptop Computer), a personal digital assistant (PDA for short), a mobile Internet device (MID), or a wearable device (Wearable Device). It should be noted that the terminal is not limited to any specific type in some embodiments of this disclosure.

In some embodiments of this disclosure, a core-network element (CN network element) may include, but is not limited to, at least one of the following: a core network device, a core network node, a core network function, a core-network element, a mobility management entity (MME), an access and mobility management function (AMF), a session management function (SMF), a user plane function (UPF), a serving gateway (serving GW, SGW), a PDN gateway (PDN Gate Way), a policy control function (PCF), a policy and charging rules function (PCRF), a serving GPRS support node (SGSN), a gateway GPRS support node (GGSN), and a radio access network device.

In some embodiments of this disclosure, a RAN network element may include, but is not limited to, at least one of the following: a radio access network device, a radio access network node, a radio access network function, a radio access network unit, a 3GPP radio access network, a non-3GPP radio access network, a centralized unit (CU), a distributed unit (DU), a base station, an evolved NodeB (evolved Node B, eNB), a 5G base station (gNB), a radio network controller (RNC), a NodeB (NodeB), a non-3GPP interworking function (N3IWF), an access controller (AC) node, an access point (AP) device, or a wireless local area network (WLAN) node.

In addition, some embodiments of this disclosure are not limited to the network architecture in FIG. 1, and may be applied to, for example, a communications system architecture without a bridge.

Figure 2:
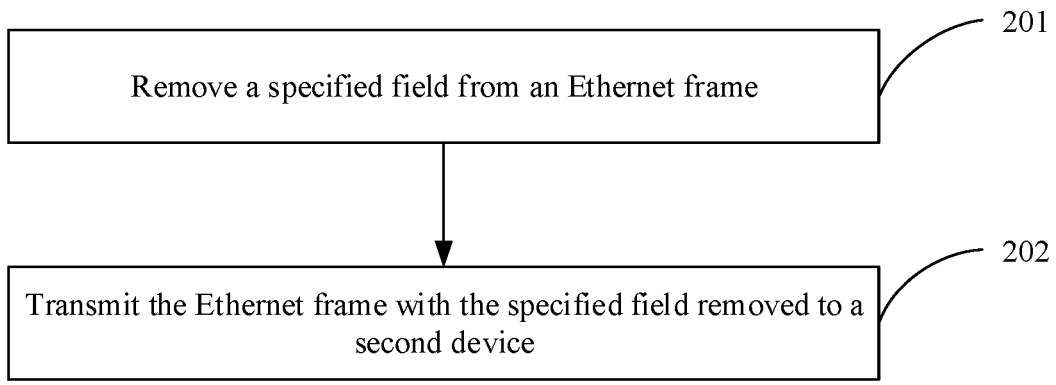
FIG. 2 is a flowchart of an Ethernet frame transmission method according to some embodiments of this disclosure.

FIG. 2 is a flowchart of an Ethernet frame transmission method according to some embodiments of this disclosure. The method is applied to a first device, and includes the following steps, as shown in FIG. 2.

Step 201: Remove a specified field from an Ethernet frame.

The specified field may be a specified field corresponding to a format of the Ethernet frame (which may also be referred to as a frame format). For example, corresponding specified fields may be configured in advance for different formats. Certainly, this is not limited. For example, the specified field may be specified by a protocol to be, for example, a preamble field or a start frame delimiter field. Alternatively, the specified field may be configured by a network or the like.

The Ethernet frame may be an uplink Ethernet frame or a downlink Ethernet frame.

Step 202: Transmit the Ethernet frame with the specified field removed to a second device.

With the foregoing step, the Ethernet frame can be compressed for transmission, thereby reducing resource overheads required for transmitting the Ethernet frame.

It should be noted that in some embodiments of this disclosure, the first device may be an ingress device of a bridge, and the second device may be an egress device of the bridge. For example, the first device may be an ingress device in the network architecture in FIG. 1 or FIG. 2 or in a 5G system, and the second device may be an egress device in the network architecture in FIG. 1 or FIG. 2 or in the 5G system. Certainly, this is not limited. For example, in some embodiments of this disclosure, when applied to a network architecture other than the network architectures in FIG. 1 and FIG. 2, the first device may be a terminal, a core-network element (for example, an UPF), or the like in the network architecture, and the second device may be a core-network element or a terminal.

In an optional embodiment, the specified field includes at least one of the following:

a preamble (preamble) field, a start frame delimiter (SFD) field, a frame check sequence (FCS) field, a length (length) field, a padding field, and an extension field.

The preamble field may be an N-byte preamble field at the start of the Ethernet frame, for example, a 7-byte preamble field at the start of the Ethernet frame.

The start frame delimiter field may be a 1-byte start frame delimiter field immediately following the preamble field in the Ethernet frame.

The length field may be an M-byte (for example, 2-byte) length field preceding a data field in the Ethernet frame, and may be used to indicate a length of the data field.

The frame check sequence field may be a K-byte (for example, 4-byte) frame check sequence field following the data field or the padding field in the Ethernet frame.

The padding field may be a padding (padding) field following the data field in the Ethernet frame.

The extension field (or referred to as an extension bit field) may be an extension (extension) field at the end of the Ethernet frame.

It should be noted that in practical application, some Ethernet frames may include different fields. For example, some Ethernet frames include a length field, a frame check sequence field, a padding field, and an extension field. However, some other Ethernet frames may exclude at least one of the length field, the frame check sequence field, the padding field, and the extension field. In this case, the specified field also excludes these fields.

However, it should be noted that when the Ethernet frame includes all of the plurality of fields, it does not mean that the specified field includes the plurality of fields. The specified field may include only some of the plurality of fields. This may be set based on an actual situation.

In this embodiment, at least one of the preamble field, the start frame delimiter field, the frame check sequence field, the length field, the padding field, and the extension field can be removed, thereby reducing resource overheads required for transmitting the Ethernet frame.

Certainly, the removed field must be a field in the Ethernet frame. For example, if the Ethernet frame includes the frame check sequence field, the frame check sequence field is removed from the Ethernet frame; if the Ethernet frame includes the length field, the length field is removed from the Ethernet frame; if the Ethernet frame includes the padding field, the padding field is removed from the Ethernet frame; and if the Ethernet frame includes the extension field, the extension field is removed from the Ethernet frame.

It should be noted that in some embodiments of this disclosure, neither the format or type of the Ethernet frame nor locations of the plurality of fields are limited.

Optionally, the removing a specified field from an Ethernet frame includes at least one of the following:

removing the frame check sequence field if it is determined, based on a first Ethernet frame size and a second Ethernet frame size, that the Ethernet frame includes the frame check sequence field or if it is determined, based on a format of the Ethernet frame, that the Ethernet frame includes the frame check sequence field, where the first Ethernet frame size is an actually received Ethernet frame size of the Ethernet frame, and the second Ethernet frame size is an Ethernet frame size determined by parsing the format of the Ethernet frame;

removing the padding field if it is determined, based on an actual data field length of the Ethernet frame and a protocol-prescribed minimum data field length corresponding to a format of the Ethernet frame, that the Ethernet frame includes the padding field or if it is determined, based on a type field in the Ethernet frame, that the Ethernet frame includes the padding field, where the actual data field length is a length indicated by the length field, or the actual data field length is a data field length of the Ethernet frame determined based on the type field in the Ethernet frame; and removing the extension field if it is determined, based on an Ethernet slot time and a minimum frame size supported by a format of the Ethernet frame, that the Ethernet frame includes the extension field.

The including at least one of the following may be understood as including any one or more of the three items. An Ethernet frame size determined by parsing the format of the Ethernet frame excludes the frame check sequence field.

The determining, based on a first Ethernet frame size and a second Ethernet frame size, that the Ethernet frame includes the frame check sequence field may be determining that the Ethernet frame includes the frame check sequence field if the first Ethernet frame size is different from the second Ethernet frame size; otherwise, determining that the Ethernet frame excludes the frame check sequence field. In addition, for some Ethernet frame formats, the frame check sequence field is constantly included or excluded. Therefore, it can be determined, based on the format of the Ethernet frame, whether the Ethernet frame includes the frame check sequence field.

In this embodiment, whether the frame check sequence field is included can be accurately determined, and if the frame check sequence field is included, the frame check sequence field is removed, thereby reducing transmission resource overheads.

The determining, based on an actual data field length of the Ethernet frame and a protocol-prescribed minimum data field length corresponding to a format of the Ethernet frame, that the Ethernet frame includes the padding field may be determining that the padding field is included if the actual data field length is less than the minimum data field length; otherwise, determining that the padding field is excluded. Optionally, a length of the padding field is a difference between the minimum data field length and the actual data field length.

The determining, based on a type field in the Ethernet frame, that the Ethernet frame includes the padding field may be determining, based on the type field in the Ethernet frame, that the data field of the Ethernet frame carries an IP, address resolution protocol (ARP), or reverse address resolution protocol (RARP) data packet, so as to determine whether the Ethernet frame carries the padding field and the number of bytes occupied by the padding field. For example, if it is determined, based on the type field, that the data field of the Ethernet frame carries an ARP data packet, it can be determined, based on a fact that an ARP data packet constantly occupies 28 bytes, that the Ethernet frame carries the padding field, and then the number of bytes occupied by the padding field can be determined based on the minimum data field length.

In this embodiment, whether the padding field is included can be accurately determined, and if the padding field is included, the padding field is removed, thereby reducing transmission resource overheads.

The determining, based on an Ethernet slot time and a minimum frame size supported by a format of the Ethernet frame, that the Ethernet frame includes the extension field may be determining that the Ethernet frame includes the extension field if the minimum frame size is less than the slot time; otherwise, determining that the Ethernet frame excludes the extension field. Optionally, a length of the extension field is a difference between the slot time and the Ethernet frame size determined by parsing the format of the Ethernet frame, where the Ethernet frame size herein excludes the extension field. The Ethernet slot time information may be obtained through interaction between 5GS and Ethernet devices before data transmission is established.

In this embodiment, whether the extension field is included can be accurately determined, and if the extension field is included, the extension field is removed, thereby reducing transmission resource overheads.

Optionally, the method further includes at least one of the following:

transmitting a first indication to the second device in a case that the frame check sequence field is removed, where the first indication is used to indicate that the frame check sequence field in the Ethernet frame is removed; and transmitting a second indication to the second device in a case that the extension field is removed, where the second indication is used to indicate that the extension field in the Ethernet frame is removed.

It should be noted that the at least one may mean one or more of the two items. To be specific, in a cast that the frame check sequence field and the extension field are removed, the first indication and the second indication may be transmitted, or only the first indication or the second indication may be transmitted. For example, because it may be determined, based on the format of the Ethernet frame, whether the Ethernet frame includes the frame check sequence field, in this case, the first indication may not be transmitted.

The first indication and the second indication may be transmitted in a same message or different messages, and certainly, may be transmitted in the Ethernet frame. For example, the first indication is indicated by one bit, and the second indication is indicated by another bit.

In this embodiment, the first indication and/or second indication may be transmitted to accurately notify the second device of a field removal status of the Ethernet frame, so that the second device can correctly perform decompression.

In an optional embodiment, the removing a specified field from an Ethernet frame includes:

removing the specified field from the Ethernet frame if the received Ethernet frame is a valid Ethernet frame.

In this embodiment, the specified field can be removed in the case of a valid Ethernet frame, thereby avoiding invalid operations so as to reduce power consumption.

Optionally, the method further includes:

discarding the Ethernet frame if the received Ethernet frame is an invalid Ethernet frame.

Whether the Ethernet frame is an invalid Ethernet frame may be determined after the format of the received Ethernet frame is determined. The Ethernet frame may be determined to be a valid Ethernet frame if it is not an invalid Ethernet frame. For example, an invalid Ethernet frame is determined in the following manners:

if a length of the Ethernet frame is not an integer number of bytes, the Ethernet frame is an invalid Ethernet frame; or if a value indicated by the length field of the Ethernet frame does not match a data field length of the Ethernet frame, the Ethernet frame is an invalid Ethernet frame; or if a frame check code calculated by the first device by using a frame check code algorithm does not match a value indicated by the frame check sequence field in the Ethernet frame, the Ethernet frame is an invalid Ethernet frame.

The Ethernet frame may be determined to be a valid Ethernet frame if it is not an invalid Ethernet frame.

That a value indicated by the length field of the Ethernet frame does not match a data field length of the Ethernet frame may be that the value indicated by the length field of the Ethernet frame is not consistent with the data field length of the Ethernet frame.

The frame check code algorithm may be an algorithm prescribed by a protocol or configured by a network. That a frame check code calculated by the first device by using a frame check code algorithm does not match a value indicated by the frame check sequence field in the Ethernet frame may be that the frame check code calculated by the first device by using a frame check code algorithm is not consistent with the value indicated by the frame check sequence field in the Ethernet frame.

In this embodiment, the invalid Ethernet frame can be discarded, thereby saving transmission resources and reducing power consumption.

In an optional embodiment, the transmitting the Ethernet frame with the specified field removed to a second device may include:

transmitting the Ethernet frame with the specified field removed to the second device through a RAN.

The Ethernet frame may be an uplink Ethernet frame or a downlink Ethernet frame.

Optionally, an Ethernet frame header of the Ethernet frame is a compressed Ethernet frame header, thereby further reducing the transmission overheads. For example, the compression may be removing the Ethernet frame header in the specified Ethernet frame field. The specified Ethernet frame field may include but is not limited to at least one of the following:

a media access control MAC source address field, a MAC destination address field, a type field, a service tag (S-TAG) field, a priority code point (PCP) field, a drop eligibility indicator (DEI) field, and a VLAN identifier (VID) field.

The Ethernet frame header may be compressed by the first device, such as a core-network element (for example, a UPF) or a terminal, and then transmitted to the RAN. In addition, if the Ethernet frame header is compressed by a core-network element, the network element may transmit relationship information including a value of the specified Ethernet frame field to a terminal and/or a RAN network element. Further, the relationship information may further include length information of the compressed Ethernet frame header, facilitating decompression by the terminal. Alternatively, the compression may be performed by a RAN network element. No limitation is imposed in this sense. For example, in a 5G system, if the 5G system makes configuration such that Ethernet frame header compression is performed between a terminal and a core network, the terminal and the core-network element are used as anchor points for Ethernet frame header compression and decompression, and a compressed Ethernet frame is transmitted to an egress device of the 5G system through a RAN. For another example, if the 5G system makes configuration such that Ethernet frame header compression is performed between a terminal and a RAN, the terminal and a RAN network element are used as anchor points for Ethernet frame header compression and decompression.

In some embodiments of this disclosure, the specified field is removed from the Ethernet frame; and the Ethernet frame with the specified field removed is transmitted to the second device. Since the specified field is removed from the Ethernet frame, resource overheads required for transmitting the Ethernet frame can be reduced.

Figure 3:
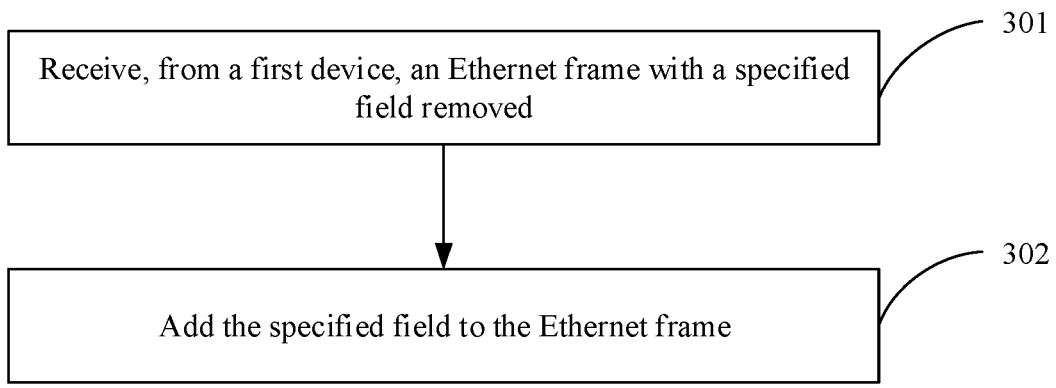
FIG. 3 is another flowchart of an Ethernet frame transmission method according to some embodiments of this disclosure.

FIG. 3 is another flowchart of an Ethernet frame transmission method according to some embodiments of this disclosure. The method is applied to a second device, and includes the following steps, as shown in FIG. 3.

Step 301: Receive, from a first device, an Ethernet frame with a specified field removed.

For the first device, the second device, the specified field, and the like, reference may be made to the corresponding description in the embodiment in FIG. 2. Details are not repeated herein.

Step 302: Add the specified field to the Ethernet frame.

The adding the specified field to the Ethernet frame may be understood as a decompression process: adding the specified field not transmitted in (that is, removed from) the Ethernet frame. Specifically, a value of the specified field is added.

The foregoing method can implement transmission of the compressed Ethernet frame, thereby reducing resource overheads required for transmitting the Ethernet frame.

In an optional embodiment, the specified field includes at least one of the following:

a preamble field, a start frame delimiter field, a frame check sequence field, a length field, a padding field, and an extension field.

For the specified field, reference may be made to the corresponding description in the embodiment in FIG. 2. Details are not repeated herein.

Optionally, a value of the length field corresponds to a data field length of the Ethernet frame.

In this embodiment, it may be that if a corresponding Ethernet frame format of the Ethernet frame carries a length field, the length field is added to a specified location (that is, a location of the length field) in the Ethernet frame, and a value of the field is set to an actual data field length of the Ethernet frame.

The preamble field may be set to a protocol-prescribed value at a preamble field location. For example, a 7-byte preamble field is added at a start location of the Ethernet frame, and a value of the field is set to a protocol-prescribed value.

The start frame delimiter field may be set to a protocol-prescribed value at a start frame delimiter field location. For example, a 1-byte SFD field is added immediately following the preamble field, and a value of the field is set to a protocol-prescribed value.

It should be noted that a location of each of the foregoing fields may be defined in a protocol, pre-configured, or the like. This is not limited.

Optionally, the method further includes at least one of the following:

receiving a first indication from the first device in a case that the frame check sequence field in the Ethernet frame is removed, where the first indication is used to indicate that the frame check sequence field in the Ethernet frame is removed; and receiving a second indication from the first device in a case that the extension field in the Ethernet frame is removed, where the second indication is used to indicate that the extension field in the Ethernet frame is removed.

It should be noted that because whether the Ethernet frame includes the frame check sequence field may be determined based on a format of the Ethernet frame, the first indication may not be received in a case that the frame check sequence field is removed from the Ethernet frame, and whether the Ethernet frame includes the frame check sequence field is determined based on the format of the Ethernet frame.

For the first indication and the second indication, reference may be made to the corresponding description in the embodiment in FIG. 2. Details are not repeated herein.

Optionally, the adding the specified field to the Ethernet frame includes at least one of the following:

adding the frame check sequence field to the Ethernet frame if the first indication is received, where the frame check sequence field is calculated by using a frame check code algorithm;

adding the extension field to the Ethernet frame if the second indication is received, where a length of the extension field is a difference between an Ethernet slot time and an actually received length of the Ethernet frame; and adding the padding field to the Ethernet frame if an actual data field length of the Ethernet frame is less than a protocol-prescribed minimum data field length corresponding to a format of the Ethernet frame, where a length of the padding field is a difference between the minimum data field length and the actual data field length.

Values of the padding field and the extension field may be protocol-prescribed values.

For this embodiment, reference may be made to the corresponding description in the embodiment in FIG. 2. Details are not repeated herein. Same beneficial effects can be achieved.

Optionally, the first device is an ingress device of a bridge, and the second device is an egress device of the bridge.

For this embodiment, reference may be made to the corresponding description in the embodiment in FIG. 2. Details are not repeated herein. Same beneficial effects can be achieved.

Optionally, after the adding the specified field to the Ethernet frame, the method further includes:

transmitting the Ethernet frame with the specified field added to an external device of the bridge.

In this embodiment, a complete Ethernet frame can be transmitted to the external device to improve transmission performance.

Optionally, the receiving, from a first device, an Ethernet frame with a specified field removed includes:

receiving, from the first device through a RAN, the Ethernet frame with the specified field removed.

For this embodiment, reference may be made to the corresponding description in the embodiment in FIG. 2. Details are not repeated herein. Same beneficial effects can be achieved.

Optionally, an Ethernet frame header of the Ethernet frame is a compressed Ethernet frame header, and after the receiving, from the first device through a RAN, the Ethernet frame with the specified field removed, the method further includes:

decompressing the Ethernet frame header.

The decompressing the Ethernet frame header may be adding the specified Ethernet frame field removed, for example, at least one of the following:

a MAC source address field, a MAC destination address field, a type field, a service tag (S-TAG) field, a priority code point (PCP) field, a drop eligibility indicator (DEI) field, and a VLAN identifier (VID) field.

A value of the specified Ethernet frame field may be obtained based on an uncompressed Ethernet frame header. To be specific, an Ethernet frame including an uncompressed Ethernet frame header may be transmitted first, and after it is successfully received, the Ethernet frame including the compressed Ethernet frame header may be transmitted. Alternatively, a value of the specified Ethernet frame field is configured based on relationship information, so that the Ethernet frame including the compressed Ethernet frame header can be directly transmitted.

In this embodiment, the Ethernet frame with the specified field added or with the decompressed Ethernet frame header may be transmitted to the external device of the bridge.

In this embodiment, the transmission overheads can be further reduced.

In this embodiment, the resource overheads required for transmitting the Ethernet frame can be reduced.

An example is used below for description. In the example, the first device is an ingress device (for example, UE or a UPF) of a 5G system, and the second device is an output device (for example, a UPF or UE) of the 5G system.

Step 1: The ingress device of the 5G system receives an Ethernet frame from an external device (for example, an Ethernet transmit terminal device, a bridge, or an Ethernet switch), and processes the received Ethernet frame in any one of the following manners after parsing each field in the Ethernet frame and determining a specific format of the Ethernet frame:

determining that the Ethernet frame is an invalid frame and discarding the Ethernet frame if a length of the received Ethernet frame is not an integer number of bytes;

determining that the Ethernet frame is an invalid Ethernet frame and discarding the Ethernet frame if a value indicated by a length field in the Ethernet frame does not match a data field length of the Ethernet frame;

determining that the Ethernet frame is an invalid Ethernet frame and discarding the Ethernet frame if a frame check code calculated by the ingress device by using an algorithm prescribed by a protocol or configured by a network does not match a value indicated by a frame check code field in the Ethernet frame; and determining that the received Ethernet frame is a valid Ethernet frame and processing a field in the Ethernet frame, if the ingress device of the 5G system does not discard the received Ethernet frame based on the foregoing determining conditions, where the processing is one or a combination of the following:

removing a preamble field from the Ethernet frame, for example, a 7-byte preamble field at the start of the Ethernet frame;

removing a start frame delimiter field from the Ethernet frame, for example, a 1-byte SFD (start frame delimiter) field immediately following the preamble field in the Ethernet frame;

removing a frame check sequence field from the Ethernet frame if the Ethernet frame includes the frame check sequence field, for example, a 4-byte FCS (frame check sequence) field following a data field or a padding field;

removing a length field from the Ethernet frame if the Ethernet frame includes the length field, for example, a 2-byte length field preceding the data field;

removing the padding field from the Ethernet frame if the Ethernet frame includes the padding field, for example, a padding field following the data field; and removing an extension bit field from the Ethernet frame if the Ethernet frame includes the extension bit field, for example, an extension field at the end of the Ethernet frame.

Removing the frame check sequence field (FCS) is specifically as follows:

determining whether an actually received Ethernet frame size and an Ethernet frame size determined by parsing the Ethernet frame (excluding the frame check sequence field) are consistent, and if consistent, determining that the frame check sequence field is not carried, or if inconsistent, determining that the frame check sequence field is carried;

removing four bytes following the data field or the padding field (if any) if it is determined that the Ethernet frame carries the frame check sequence field; and indicating, to the egress device, that the frame check sequence field is removed if the frame check sequence field has been removed.

Removing the padding field (padding) is specifically as follows:

determining whether the padding field is carried by comparing the value indicated by the length field with a minimum data field length prescribed by a corresponding protocol and determined based on an Ethernet frame format, for example, if the value is less than the minimum data field length prescribed by the protocol, determining that the padding field is carried; otherwise, determining that the padding field is not carried (applicable to Ethernet 802.3); or determining, based on a type field in the Ethernet frame, whether the padding field is carried (applicable to Ethernet II); and removing a byte following the data field in the Ethernet frame if it is determined that the Ethernet frame carries the padding field, where the specific number of bytes removed is equal to a difference between the minimum data field length supported by the protocol and an actual data field length.

Removing the extension (extension) field is specifically as follows:

determining whether the extension field is carried by comparing an Ethernet slot time (for example, a 1000-Mbps slot time (slotTime) is 512 bytes) with a minimum frame size supported by a corresponding Ethernet frame format, where for example, for a 10-Mbps or 100-Mbps Ethernet, if a slot time is fixedly 64 bytes, and a protocol-prescribed minimum Ethernet frame size is 64 bytes, in this scenario, a transmitted Ethernet frame does not carry the extension field;

removing the extension field at the end of the Ethernet frame if it is determined that the Ethernet frame carries the extension field, where the specific number of bytes removed is equal to a difference of the Ethernet slot time and the Ethernet frame size (excluding the extension field) determined by parsing the Ethernet frame; and indicating, to the egress device of the 5G system, that the extension field is removed if the extension field has been removed.

Step 2: The ingress device of the 5G system transmits the valid Ethernet frame processed in step 1 to a packet filter to obtain a quality of service flow (QoS flow), and transmits the QoS flow to the egress device of the 5G system through a RAN. In addition, if the 5G system configures that Ethernet frame header compression is performed between a terminal and a core network, the terminal and a core-network element are used as anchor points to perform Ethernet frame header compression and decompression, and the compressed Ethernet frame is transmitted to the egress device of the 5G system through the RAN; and if the 5G system configures that Ethernet frame header compression is performed between a terminal and a RAN, the terminal and a RAN network element are used as anchor points to perform Ethernet frame header compression and decompression.

Step 3: Before transmitting the decompressed Ethernet frame, the egress device of the 5G system performs corresponding processing on the decompressed Ethernet frame according to a related instruction and/or an operation prescribed by a protocol, where the processing is one or a combination of the following:

adding the preamble field to the Ethernet frame, for example, adding a 7-byte preamble field at a start location of the Ethernet frame, and setting a value of the field to a protocol-prescribed value;

adding the start frame delimiter field to the Ethernet frame, for example, adding a 1-byte SFD field immediately following the preamble field, and setting a value of the field to a protocol-prescribed value;

if a corresponding Ethernet frame format carries the length field, adding the length field to a specified location in the Ethernet frame and setting a value of the field to an actual data field length of the Ethernet frame;

if the actual data field length of the Ethernet frame is less than a minimum data field length supported by the corresponding Ethernet frame format, adding the padding field following the data field of the Ethernet frame, and setting a value of the field to a protocol-prescribed value, where a length of the padding field is a difference between the minimum data field length supported by the Ethernet frame format and the actual data field length of the Ethernet;

if an indication that the ingress device of the 5G system has removed the frame check sequence field is received, adding the frame check sequence field at a specified location in the Ethernet frame, and setting a value of the field to a frame check code value calculated by using an algorithm prescribed by a protocol or configured by a network; and if an indication that the ingress device of the 5G system has removed the extension bit field is received, adding the extension field at the end of the Ethernet frame, and setting a value of the field to a protocol-prescribed value, where a length of the extension field is a difference between an Ethernet slot time field and an actual Ethernet frame size corresponding to a restored Ethernet frame not transmitted in the 5GS.

Step 4: The egress device of the 5G system transmits the Ethernet frame processed in step 3 to an external device (for example, an Ethernet receive terminal, a bridge, or an Ethernet switch).

With the methods provided in some embodiments of this disclosure, specific processing can be performed on a field carried in an Ethernet frame while ensuring that the Ethernet frames can be transmitted in a wireless mobile communications system, thereby reducing resource overheads required for transmitting the Ethernet frame in a 5G system.

Figure 4:
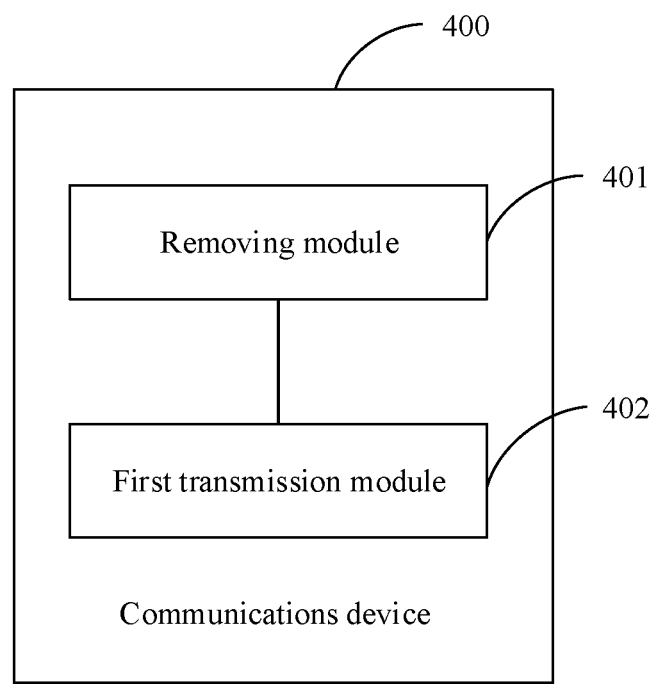
FIG. 4 is a structural diagram of a communications device according to some embodiments of this disclosure.

FIG. 4 is a structural diagram of a communications device according to an embodiment of this disclosure. The communications device is a first device. As shown in FIG. 4, the communications device 400 includes:

a removing module 401, configured to remove a specified field from an Ethernet frame; and a first transmission module 402, configured to transmit the Ethernet frame with the specified field removed to a second device.

Optionally, the specified field includes at least one of the following:

a preamble field, a start frame delimiter field, a frame check sequence field, a length field, a padding field, and an extension field.

Optionally, the removing module 401 is configured to perform at least one of the following:

removing the frame check sequence field if it is determined, based on a first Ethernet frame size and a second Ethernet frame size, that the Ethernet frame includes the frame check sequence field or if it is determined, based on a format of the Ethernet frame, that the Ethernet frame includes the frame check sequence field, where the first Ethernet frame size is an actually received Ethernet frame size of the Ethernet frame, and the second Ethernet frame size is an Ethernet frame size determined by parsing the format of the Ethernet frame;

removing the padding field if it is determined, based on an actual data field length of the Ethernet frame and a protocol-prescribed minimum data field length corresponding to a format of the Ethernet frame, that the Ethernet frame includes the padding field or if it is determined, based on a type field in the Ethernet frame, that the Ethernet frame includes the padding field, where the actual data field length is a length indicated by the length field; and removing the extension field if it is determined, based on an Ethernet slot time and a minimum frame size supported by a format of the Ethernet frame, that the Ethernet frame includes the extension field.

Figure 5:
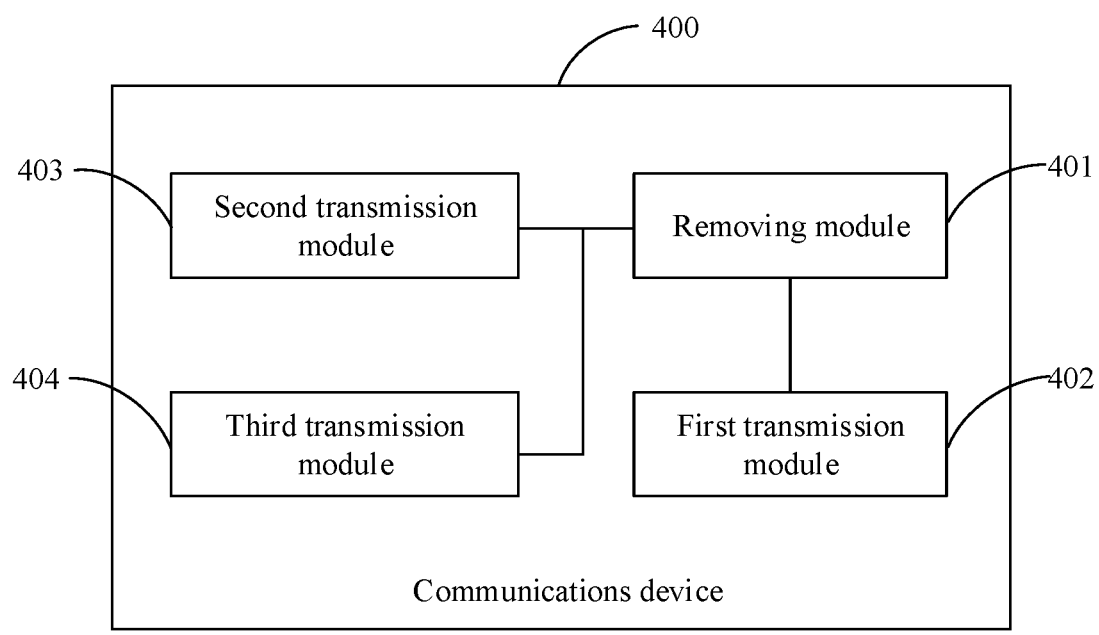
FIG. 5 is a structural diagram of a communications device according to some embodiments of this disclosure.

Optionally, as shown in FIG. 5, the communications device 400 further includes at least one of the following:

a second transmission module 403, configured to transmit a first indication to the second device in a case that the frame check sequence field is removed, where the first indication is used to indicate that the frame check sequence field in the Ethernet frame is removed; and a third transmission module 404, configured to transmit a second indication to the second device in a case that the extension field is removed, where the second indication is used to indicate that the extension field in the Ethernet frame is removed.

Optionally, a length of the padding field is a difference between the minimum data field length and the actual data field length; and/or a length of the extension field is a difference between the slot time and the Ethernet frame size determined by parsing the format of the Ethernet frame.

Optionally, the removing a specified field from an Ethernet frame includes:

removing the specified field from the Ethernet frame if the received Ethernet frame is a valid Ethernet frame.

Figure 6:
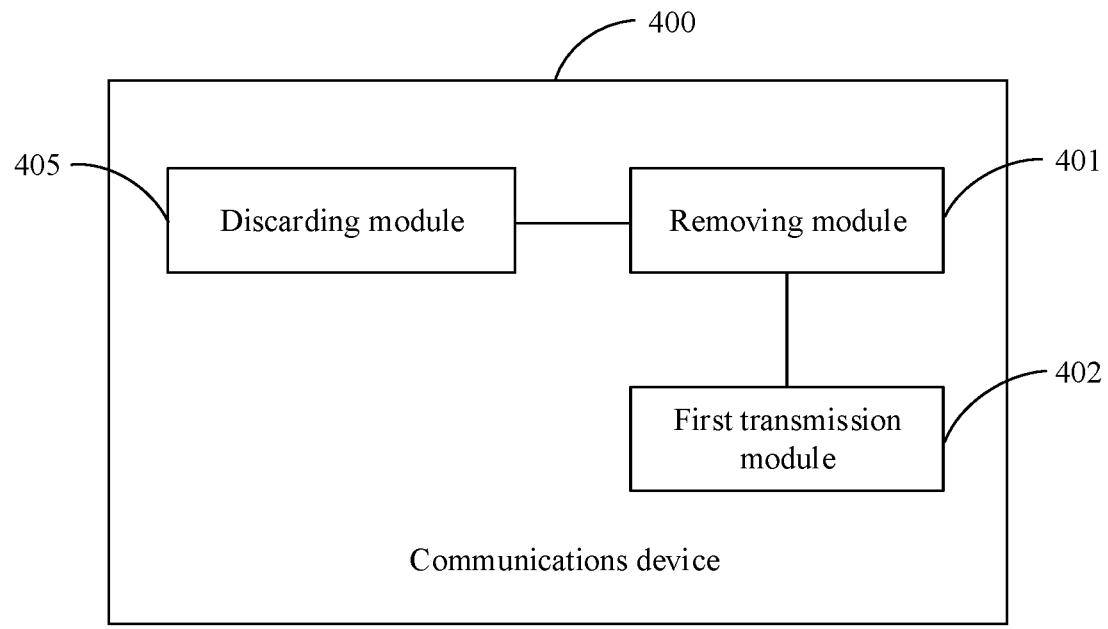
FIG. 6 is a structural diagram of a communications device according to some embodiments of this disclosure.

Optionally, as shown in FIG. 6, the communications device 400 further includes:

a discarding module 405, configured to discard the Ethernet frame if the received Ethernet frame is an invalid Ethernet frame.

Optionally, if a length of the Ethernet frame is not an integer number of bytes, the Ethernet frame is an invalid Ethernet frame; or if a value indicated by the length field of the Ethernet frame does not match a data field length of the Ethernet frame, the Ethernet frame is an invalid Ethernet frame; or if a frame check code calculated by the first device by using a frame check code algorithm does not match a value indicated by the frame check sequence field in the Ethernet frame, the Ethernet frame is an invalid Ethernet frame.

Optionally, the first device is an ingress device of a bridge, and the second device is an egress device of the bridge.

Optionally, the first transmission module 402 is configured to transmit the Ethernet frame with the specified field removed to the second device through a RAN.

Optionally, an Ethernet frame header of the Ethernet frame is a compressed Ethernet frame header.

The communications device 400 can implement the processes implemented by the first device in the method embodiment of this disclosure, with the same beneficial effects achieved. To avoid repetition, details are not described herein again.

Figure 7:
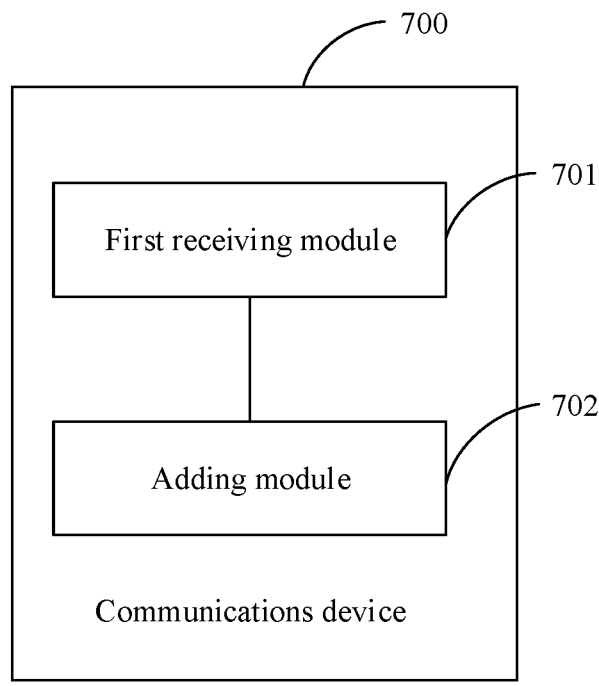
FIG. 7 is a structural diagram of a communications device according to some embodiments of this disclosure.

FIG. 7 is another structural diagram of a communications device according to some embodiments of this disclosure. The communications device is a second device. As shown in FIG. 7, the communications device 700 includes:

a first receiving module 701, configured to receive, from a first device, an Ethernet frame with a specified field removed; and an adding module 702, configured to add the specified field to the Ethernet frame.

Optionally, the specified field includes at least one of the following:

a preamble field, a start frame delimiter field, a frame check sequence field, a length field, a padding field, and an extension field.

Figure 8:
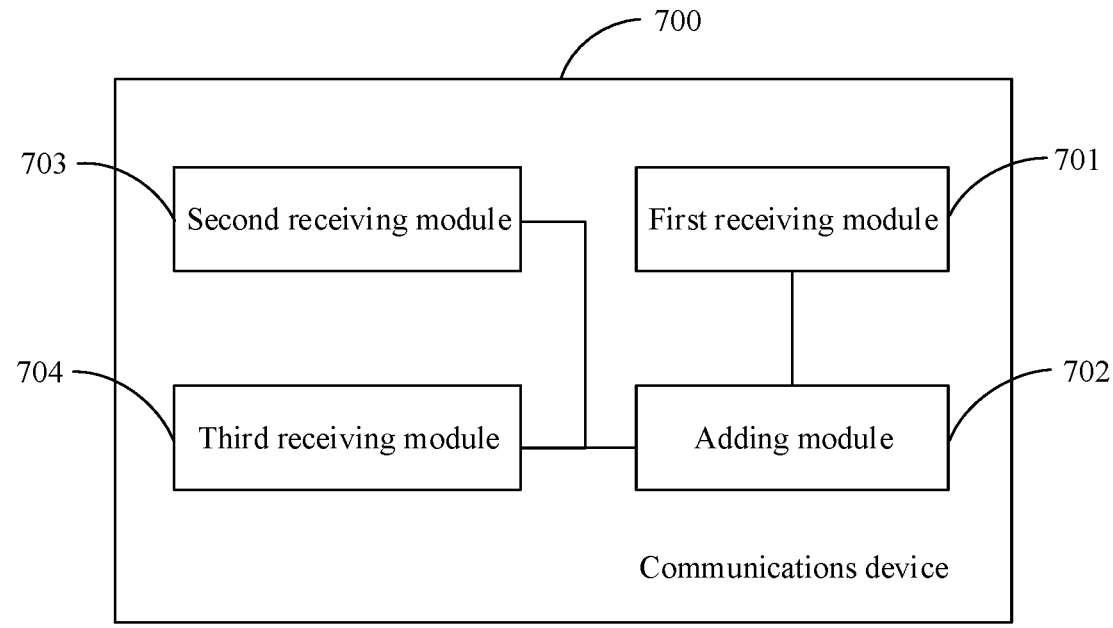
FIG. 8 is a structural diagram of a communications device according to some embodiments of this disclosure.

Optionally, as shown in FIG. 8, the communications device 700 further includes at least one of the following:

a second receiving module 703, configured to receive a first indication from the first device in a case that the frame check sequence field in the Ethernet frame is removed, where the first indication is used to indicate that the frame check sequence field in the Ethernet frame is removed; and a third receiving module 704, configured to receive a second indication from the first device in a case that the extension field in the Ethernet frame is removed, where the second indication is used to indicate that the extension field in the Ethernet frame is removed.

Optionally, a value of the length field corresponds to a data field length of the Ethernet frame.

Optionally, the adding module 702 is configured to perform at least one of the following:

adding the frame check sequence field to the Ethernet frame if the first indication is received, where the frame check sequence field is calculated by using a frame check code algorithm;

adding the extension field to the Ethernet frame if the second indication is received, where a length of the extension field is a difference between an Ethernet slot time and an Ethernet frame size (excluding the extension field) determined by parsing a format of the Ethernet frame; and adding the padding field to the Ethernet frame if an actual data field length of the Ethernet frame is less than a protocol-prescribed minimum data field length corresponding to a format of the Ethernet frame, where a length of the padding field is a difference between the minimum data field length and the actual data field length.

Optionally, the first device is an ingress device of a bridge, and the second device is an egress device of the bridge.

Figure 9:
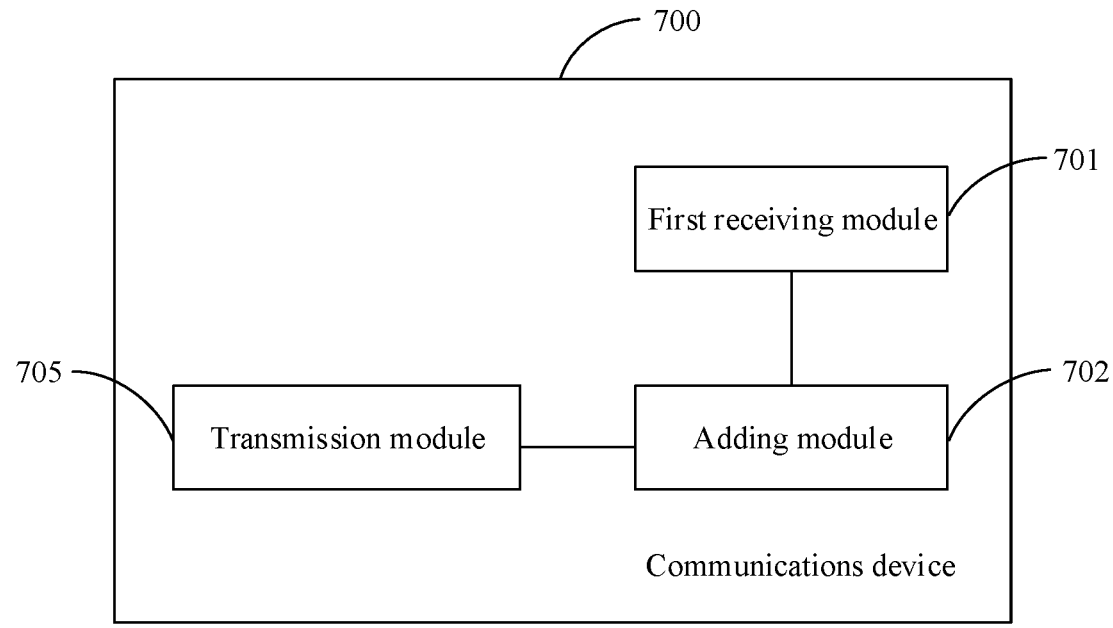
FIG. 9 is a structural diagram of a communications device according to some embodiments of this disclosure.

Optionally, as shown in FIG. 9, the communications device 700 further includes:

a transmission module 705, configured to transmit the Ethernet frame with the specified field added to an external device of the bridge.

Optionally, the first receiving module 701 is configured to receive, from the first device through a RAN, the Ethernet frame with the specified field removed.

Figure 10:
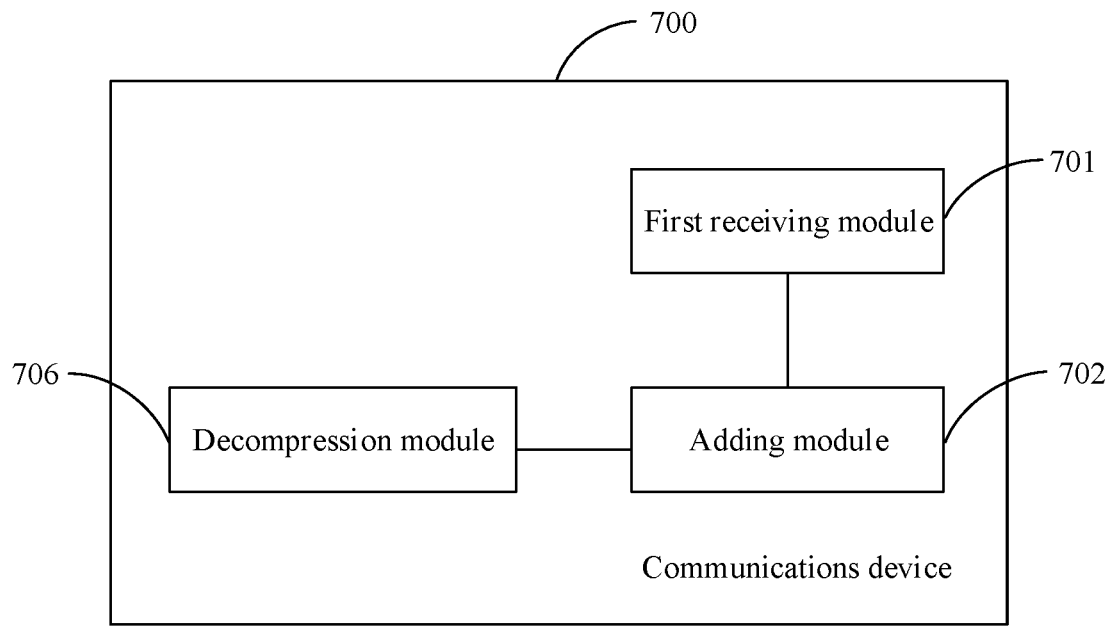
FIG. 10 is a structural diagram of a communications device according to some embodiments of this disclosure.

Optionally, an Ethernet frame header of the Ethernet frame is a compressed Ethernet frame header. As shown in FIG. 10, the communications device 700 further includes:

a decompressing module 706, configured to decompress the Ethernet frame header.

The communications device 700 can implement the processes implemented by the second device in the method embodiment of this disclosure, with the same beneficial effects achieved. To avoid repetition, details are not described herein again.

Figure 11:
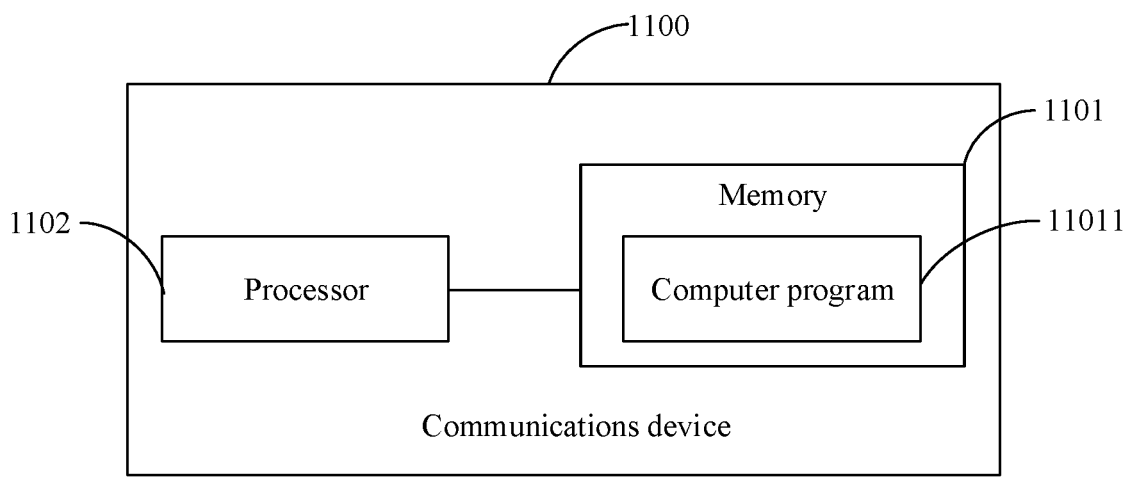
FIG. 11 is a structural diagram of a communications device according to some embodiments of this disclosure.

FIG. 11 is another structural diagram of a communications device according to some embodiments of this disclosure. As shown in FIG. 11, the communications device 1100 includes a memory 1101, a processor 1102, and a computer program 11011 stored in the memory 1101 and capable of running on the processor 1102.

When the communications device 1100 acts as the first device in the foregoing method embodiment, the following steps are implemented when the computer program 11011 is executed by the processor 1102:

removing a specified field from an Ethernet frame; and transmitting the Ethernet frame with the specified field removed to a second device.

Optionally, the specified field includes at least one of the following:

a preamble field, a start frame delimiter field, a frame check sequence field, a length field, a padding field, and an extension field.

Optionally, the removing a specified field from an Ethernet frame includes at least one of the following:

removing the frame check sequence field if it is determined, based on a first Ethernet frame size and a second Ethernet frame size, that the Ethernet frame includes the frame check sequence field or if it is determined, based on a format of the Ethernet frame, that the Ethernet frame includes the frame check sequence field, where the first Ethernet frame size is an actually received Ethernet frame size of the Ethernet frame, and the second Ethernet frame size is an Ethernet frame size determined by parsing the format of the Ethernet frame;

removing the padding field if it is determined, based on an actual data field length of the Ethernet frame and a protocol-prescribed minimum data field length corresponding to a format of the Ethernet frame, that the Ethernet frame includes the padding field or if it is determined, based on a type field in the Ethernet frame, that the Ethernet frame includes the padding field, where the actual data field length is a length indicated by the length field; and removing the extension field if it is determined, based on an Ethernet slot time and a minimum frame size supported by a format of the Ethernet frame, that the Ethernet frame includes the extension field.

Optionally, the processor 1102 is further configured to perform at least one of the following:

transmitting a first indication to the second device in a case that the frame check sequence field is removed, where the first indication is used to indicate that the frame check sequence field in the Ethernet frame is removed; and transmitting a second indication to the second device in a case that the extension field is removed, where the second indication is used to indicate that the extension field in the Ethernet frame is removed.

Optionally, a length of the padding field is a difference between the minimum data field length and the actual data field length; and/or a length of the extension field is a difference between the slot time and the Ethernet frame size determined by parsing the format of the Ethernet frame.

Optionally, the removing a specified field from an Ethernet frame performed by the processor 1102 includes:

removing the specified field from the Ethernet frame if the received Ethernet frame is a valid Ethernet frame.

Optionally, the processor 1102 is further configured to perform the following:

discarding the Ethernet frame if the received Ethernet frame is an invalid Ethernet frame.

Optionally, if a length of the Ethernet frame is not an integer number of bytes, the Ethernet frame is an invalid Ethernet frame; or if a value indicated by the length field of the Ethernet frame does not match a data field length of the Ethernet frame, the Ethernet frame is an invalid Ethernet frame; or if a frame check code calculated by the first device by using a frame check code algorithm does not match a value indicated by the frame check sequence field in the Ethernet frame, the Ethernet frame is an invalid Ethernet frame.

Optionally, the first device is an ingress device of a bridge, and the second device is an egress device of the bridge.

Optionally, the transmitting the Ethernet frame with the specified field removed to a second device performed by the processor 1102 includes:

transmitting the Ethernet frame with the specified field removed to the second device through a RAN.

Optionally, an Ethernet frame header of the Ethernet frame is a compressed Ethernet frame header.

When the communications device 1100 acts as the second device in the foregoing method embodiment, the following steps are implemented when the computer program 11011 is executed by the processor 1102:

receiving, from a first device, an Ethernet frame with a specified field removed; and adding the specified field to the Ethernet frame.

Optionally, the specified field includes at least one of the following:

a preamble field, a start frame delimiter field, a frame check sequence field, a length field, a padding field, and an extension field.

Optionally, the processor 1102 is further configured to perform at least one of the following:

receiving a first indication from the first device in a case that the frame check sequence field in the Ethernet frame is removed, where the first indication is used to indicate that the frame check sequence field in the Ethernet frame is removed; and receiving a second indication from the first device in a case that the extension field in the Ethernet frame is removed, where the second indication is used to indicate that the extension field in the Ethernet frame is removed.

Optionally, a value of the length field corresponds to a data field length of the Ethernet frame.

Optionally, the adding the specified field to the Ethernet frame includes at least one of the following:

adding the frame check sequence field to the Ethernet frame if the first indication is received, where the frame check sequence field is calculated by using a frame check code algorithm;

adding the extension field to the Ethernet frame if the second indication is received, where a length of the extension field is a difference between an Ethernet slot time and an Ethernet frame size determined by parsing a format of the Ethernet frame; and adding the padding field to the Ethernet frame if an actual data field length of the Ethernet frame is less than a protocol-prescribed minimum data field length corresponding to a format of the Ethernet frame, where a length of the padding field is a difference between the minimum data field length and the actual data field length.

Optionally, the first device is an ingress device of a bridge, and the second device is an egress device of the bridge.

Optionally, after adding the specified field to the Ethernet frame, the processor 1102 is further configured to:

transmit the Ethernet frame with the specified field added to an external device of the bridge.

Optionally, the receiving, from a first device, an Ethernet frame with a specified field removed performed by the processor 1102 includes:

receiving, from the first device through a RAN, the Ethernet frame with the specified field removed.

Optionally, an Ethernet frame header of the Ethernet frame is a compressed Ethernet frame header, and after receiving, from the first device through the RAN, the Ethernet frame with the specified field removed, the processor 1102 is further configured to:

decompress the Ethernet frame header.

The communications device 1100 can implement the processes implemented by the communications device in the foregoing method embodiments. To avoid repetition, details are not described herein again.

Some embodiments of this disclosure further provide a computer-readable storage medium, where the computer-readable storage medium stores a computer program. When the computer program is executed by a processor, the processes of any foregoing Ethernet frame transmission method embodiment can be implemented, with the same technical effects achieved. To avoid repetition, details are not described herein again. For example, the computer-readable storage medium is a read-only memory (ROM for short), a random access memory (RAM for short), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the embodiments, a person skilled in the art may clearly understand that the methods in the foregoing embodiments may be implemented by using software in combination with a necessary common hardware platform, and certainly may alternatively be implemented by using hardware. However, in most cases, the former is an example. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, and may be located in one position or distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

It can be understood that the embodiments described in the embodiments of this disclosure may be implemented by hardware, software, firmware, middleware, microcode, or a combination thereof. In case of implementation by hardware, a processing unit may be implemented in one or more application-specific integrated circuits (ASIC), digital signal processors (DSP), digital signal processing devices (DSP Device, DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but are not necessarily performed in the time sequence. Some steps may be performed in parallel or independently.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. An Ethernet frame transmission method, applied to a first device, comprising:
   removing a specified field from an Ethernet frame; and
   transmitting the Ethernet frame with the specified field removed to a second device, wherein the specified field comprises an extension field;
   wherein the removing a specified field from an Ethernet frame comprises:
   removing the extension field if it is determined, based on an Ethernet slot time and a minimum frame size supported by a format of the Ethernet frame, that the Ethernet frame comprises the extension field;
   wherein the method further comprises:
   transmitting a second indication to the second device in a case that the extension field is removed, wherein the second indication is used to indicate that the extension field in the Ethernet frame is removed.

2. The method according to claim 1, wherein the specified field further comprises at least one of the following:
   a preamble field, a start frame delimiter field, a frame check sequence field, a length field, or a padding field.

3. The method according to claim 2, wherein the removing a specified field from an Ethernet frame further comprises at least one of the following:
   removing the frame check sequence field if it is determined, based on a first Ethernet frame size and a second Ethernet frame size, that the Ethernet frame comprises the frame check sequence field or if it is determined, based on a format of the Ethernet frame, that the Ethernet frame comprises the frame check sequence field, wherein the first Ethernet frame size is an actually received Ethernet frame size of the Ethernet frame, and the second Ethernet frame size is an Ethernet frame size determined by parsing the format of the Ethernet frame; or
   removing the padding field if it is determined, based on an actual data field length of the Ethernet frame and a protocol-prescribed minimum data field length corresponding to a format of the Ethernet frame, that the Ethernet frame comprises the padding field or if it is determined, based on a type field in the Ethernet frame, that the Ethernet frame comprises the padding field, wherein the actual data field length is a length indicated by the length field.

4. The method according to claim 3, further comprising: transmitting a first indication to the second device in a case that the frame check sequence field is removed, wherein the first indication is used to indicate that the frame check sequence field in the Ethernet frame is removed.

5. The method according to claim 4, wherein a length of the padding field is a difference between the minimum data field length and the actual data field length; and/or
a length of the extension field is a difference between the slot time and the Ethernet frame size determined by parsing the format of the Ethernet frame.

6. The method according to claim 1, wherein the removing a specified field from an Ethernet frame comprises:
removing the specified field from the Ethernet frame if the received Ethernet frame is a valid Ethernet frame.

7. The method according to claim 6, further comprising: discarding the Ethernet frame if the received Ethernet frame is an invalid Ethernet frame.

8. The method according to claim 7, wherein
if a length of the Ethernet frame is not an integer number of bytes, the Ethernet frame is an invalid Ethernet frame; or
if a value indicated by the length field of the Ethernet frame does not match a data field length of the Ethernet frame, the Ethernet frame is an invalid Ethernet frame; or
if a frame check code calculated by the first device by using a frame check code algorithm does not match a value indicated by the frame check sequence field in the Ethernet frame, the Ethernet frame is an invalid Ethernet frame.

9. The method according to claim 1, wherein the transmitting the Ethernet frame with the specified field removed to a second device comprises:
transmitting the Ethernet frame with the specified field removed to the second device through a radio access network (RAN).

10. An Ethernet frame transmission method, applied to a second device, comprising:
receiving, from a first device, an Ethernet frame with a specified field removed; and
adding the specified field to the Ethernet frame, wherein the specified field comprises an extension field;
receiving a second indication from the first device in a case that the extension field in the Ethernet frame is removed, wherein the second indication is used to indicate that the extension field in the Ethernet frame is removed;
wherein the adding the specified field to the Ethernet frame comprises:
adding the extension field to the Ethernet frame if the second indication is received, wherein a length of the extension field is a difference between an Ethernet slot time and an Ethernet frame size determined by parsing a format of the Ethernet frame.

11. The method according to claim 10, wherein the specified field further comprises at least one of the following:
a preamble field, a start frame delimiter field, a frame check sequence field, a length field, ora padding field.

12. The method according to claim 11, further comprising:

receiving a first indication from the first device in a case that the frame check sequence field in the Ethernet frame is removed, wherein the first indication is used to indicate that the frame check sequence field in the Ethernet frame is removed.

13. The method according to claim 12, wherein the adding the specified field to the Ethernet frame further comprises:
adding the frame check sequence field to the Ethernet frame if the first indication is received, wherein the frame check sequence field is calculated by using a frame check code algorithm.

14. The method according to claim 11, wherein a value of the length field corresponds to a data field length of the Ethernet frame.

15. The method according to claim 11, wherein
adding the padding field to the Ethernet frame if an actual data field length of the Ethernet frame is less than a protocol-prescribed minimum data field length corresponding to a format of the Ethernet frame, wherein a length of the padding field is a difference between the minimum data field length and the actual data field length.

16. The method according to claim 10, wherein the receiving, from a first device, an Ethernet frame with a specified field removed comprises:
receiving, from the first device through a RAN, the Ethernet frame with the specified field removed.

17. A communications device, comprising a memory, a processor, and a program stored in the memory and capable of running on the processor, wherein when the program is executed by the processor, the steps of the Ethernet frame transmission method according to claim 10 are implemented.

18. A communications device, comprising a memory, a processor, and a program stored in the memory and capable of running on the processor, wherein when the program is executed by the processor, following steps are implemented:
removing a specified field from an Ethernet frame; and
transmitting the Ethernet frame with the specified field removed to a second device, wherein the specified field comprises an extension field;
wherein the removing a specified field from an Ethernet frame comprises:
removing the extension field if it is determined, based on an Ethernet slot time and a minimum frame size supported by a format of the Ethernet frame, that the Ethernet frame comprises the extension field;
wherein when the program is executed by the processor, following step is further implemented:
transmitting a second indication to the second device in a case that the extension field is removed, wherein the second indication is used to indicate that the extension field in the Ethernet frame is removed.

19. The communications device according to claim 18, the specified field further comprises at least one of the following:
a preamble field, a start frame delimiter field, a frame check sequence field, a length field, or a padding field.

20. The communications device according to claim 18, the transmitting the Ethernet frame with the specified field removed to a second device comprises:
transmitting the Ethernet frame with the specified field removed to the second device through a radio access network (RAN).

* * * * *